Nov. 26, 1935.  E. DIETZE  2,021,933

BAND SEAL

Filed May 7, 1935

INVENTOR
Emil Dietze,
BY
George D. Richards
ATTORNEY

Patented Nov. 26, 1935

2,021,933

UNITED STATES PATENT OFFICE 2,021,933

BAND SEAL

Emil Dietze, Richmond Hill, N. Y., assignor to American Casting & Manufacturing Corporation, Brooklyn, N. Y., a corporation of New York Application May 7, 1935, Serial No. 20,221

5 Claims. (Cl. 40—3)

This invention relates to band seals, such, for example, as are employed upon the legs of poultry to identify the latter or to guarantee the source of quality thereof, and for similar uses.

This invention has for its principal object to provide an initially open band seal having inviolable cooperative interlocking or sealing devices on the meeting ends thereof, which, when the band is closed in encircling relation to the leg of a fowl, automatically engage so as to prevent removal of the band without mutilation or destruction thereof. To this end the invention provides a simple and easily manipulated band seal, having novel cooperative male and female interlocking means which automatically engage when telescoped together, and wherein the interengaging elements per se are securely housed against access in attempted surreptitious release thereof.

The invention has for a further object to provide a novel means in connection with the band body of the device whereby the band may be easily broken intermediate its interlocked ends, and must be so broken to remove the same from a fowl, so that in so doing the device is destroyed against dishonest reuse.

Other objects of this invention, not at this time more particularly enumerated, will be understood from the following detailed description of the same.

Figure 1:
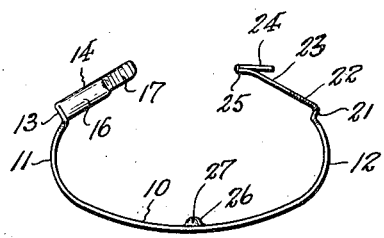
Figure 2:
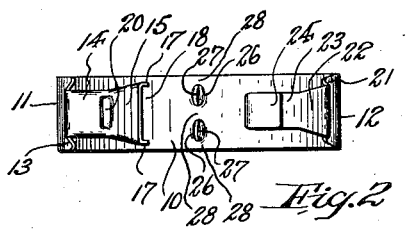
Figure 3:
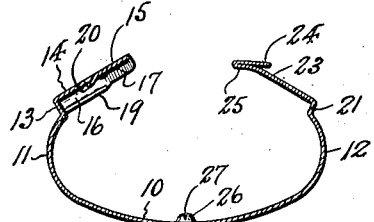

An illustrative embodiment of this invention is shown in the accompanying drawing, in which:

Fig. 1 is a side edge elevation of the band seal according to this invention, shown in open condition; Fig. 2 is a top plan view of the same in like condition; and Fig. 3 is a longitudinal sectional view of the same, also in like condition.

Figure 4:
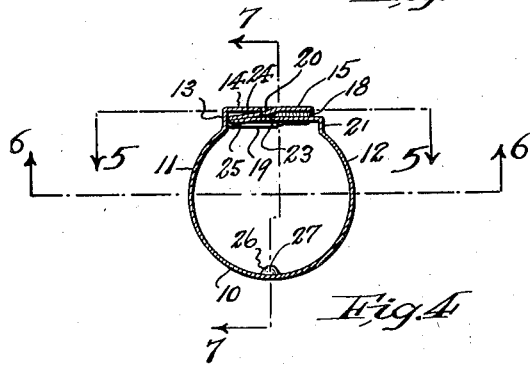
Figure 5:
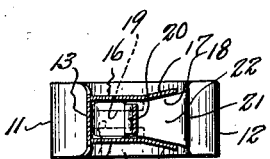
Figure 6:
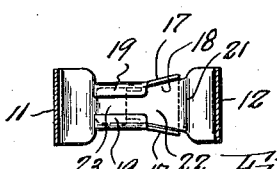
Figure 7:
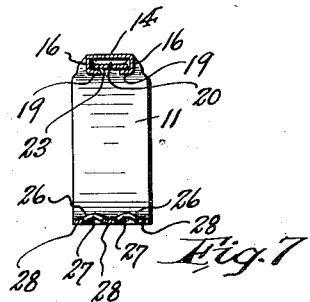

Fig. 4 is a longitudinal sectional view of the band seal in closed and locked condition; Fig. 5 is a horizontal section thereof, taken on line 5—5 in Fig. 4; Fig. 6 is a horizontal section thereof, taken on line 6—6 in Fig. 4; and Fig. 7 is a transverse vertical section, taken on line 7—7 in Fig. 4.

Similar characters of reference are employed in the above-described views, to indicate corresponding parts.

Referring to the drawing, the band seal comprises a body strip 10 of sheet material, preferably metal, having its opposite end portions 11 and 12 upwardly and inwardly curved one toward the other; said end portions being initially separated but capable of being moved together into closed relation by pinching the curved body strip between the thumb and fingers. Integrally formed in connection with one end-portion, as 11, of the body strip is a female locking means and integrally formed in connection with the other end portion, as 12, of the body strip is a cooperative male locking means.

The female locking means is formed by bending angularly outwardly a transverse part of the end portion 11 of the body strip to form the inner end wall 13 of a housing, and then bending at right angles thereto another part of said end portion 11 to provide an outwardly extending top wall 14 of the housing. From a point intermediate its length, said top wall 14 is divergently widened toward its free end, to provide an outwardly widening free end portion 15. Integral with the side margins of the top wall 14 are side wall flanges 16 which are bent downwardly at right angles to the plane of said top wall to form the sides of the housing. The portions 17 of said side wall flanges, which border the outwardly widening free end portion 15 of said top wall, are in outwardly divergent mutual relation, thus forming a funnel-like guide passage 18 leading into the interior of the housing. Integral with the free edges of the main portions 16 of said side wall flanges are inturned bottom flanges 19 which complete the housing enclosure. Inwardly struck or pressed from the main portion of the top wall 14 is a transversely disposed lock abutment 20 which is inwardly offset from the under side of the top wall within the housing interior, so as to lie intermediate the inner end wall 13 and the funnel-like guide passage 18. As thus constructed and arranged, the female locking means is somewhat outwardly offset relative to the end portion 11 of the body strip 10.

The male locking means is formed by bending angularly outwardly a transverse part of the end portion 12 of the body strip to form a carrying portion 21, and then bending at right angles thereto a forwardly extending laterally tapered base portion 22, the taper of which corresponds to the inward taper of the funnel-like guide passage 18 of the female locking element. Integral with said tapered base portion and projecting forwardly therefrom in the plane thereof is a lock-tongue 23 substantially corresponding in width to the width of the interior at the inner end portion of the female locking element housing. Integral with the free end of said lock-tongue 23, and doubled back over the upper or outer surface thereof, is a resilient upwardly and outwardly divergent lock-spur 24. Preferably the free end portion of the lock-tongue 23 is somewhat inwardly or downwardly inclined or curved, as at 25, thus providing a springy or resilient end portion at the extremity of the lock-tongue 23 for purposes which will presently appear.

The body strip 10 is provided in its medial portion with means to aid in effecting a fracture or breaking of the seal band under certain conditions. This means comprises the provision of one or more hollow tits or nodules 26 inwardly pressed from the body strip 10 and transversely disposed relative thereto. The said tits or nodules 26 are provided with transverse slits 27, which provide opposed lips. Intermediate the slitted tits or nodules 26 are left the necks 28 which form the fracture or break points of the seal band.

In applying the seal band around the leg of a fowl, or in any other place of use to which the same is adapted, the leg is passed through the opening between the normally separated seal band ends and into the embrace of the latter. Thereupon the operator grasps the seal band between the thumb and forefinger, and applying a squeezing pressure against the opposite end portions 11 and 12 of the body strip, thereby moves said end portions one toward the other. Such movement carries the male locking means toward and into engagement with the female locking means, whereby the lock-tongue 23 and its lock-spur 24 enters the funnel-like guide passage 18 so as to be guided thereby into aligned relation to the main interior of the housing of said female locking means for inward movement thereinto, whereby the lock-spur 24 passes beneath the lock abutment 20, its resiliency permitting the same to yield downwardly in passing the latter, until the lock-tongue is fully entered and the free end of the lock-spur 24 passes the lock abutment, whereupon the free end of said lock-spur 24 springs upwardly behind the lock abutment 20 so as to interengage the male and female locking means against separation. This operation is further assisted, and a firm non-releasable engagement of lock-spur and lock abutment assured, by reason of the fact that the resilient curved end portion 25 of the lock-tongue 23 bears upon the housing bottom flanges 19, being thereby placed under sufficient tension to assure a constant up-thrust of the lock-spur which in addition to the inherent resiliency of the latter functions to maintain the same in aligned and abutted relation to the lock abutment. The housing of the female locking means so encloses and guards the lock-tongue and lock-spur entered therein, that tampering access to the latter is efficiently prevented, and possibility of surreptitiously releasing the locking means without disclosing evidence of the tampering is likewise prevented.

In closing the seal band the lips defined by the slits 27 of the tits or nodules 26 press or band together thereby producing a fulcruming effect to a leverage exerted by the halves of the tits or nodules which tends to stretch and weaken the fracture or break points 28 in the body strip 10 adjacent to said tits or nodules. The thus weakened fracture or break points 28 make it possible to remove the seal band by breaking thereof intermediate its locked together end portions. This may be effected by squeezing together the seal band sides until the fracture or break occurs. It will thus be obvious that the seal band cannot be removed without destroying its usefulness, and consequently once used it cannot be surreptitiously removed and used over again.

Having now described my invention, I claim:

1. A band seal comprising, a body strip having normally separated end portions curved one toward the other, a female locking means at the extremity of one end portion comprising a housing having a laterally flared entranceway at its outer end and a transverse lock abutment inwardly pressed from its top wall intermediate said entranceway and the inner end of said housing, and a male locking means at the extremity of the other end portion comprising a lock-tongue having an inwardly inclined spring terminal portion and a lock-spur projecting backwardly and upwardly from said terminal portion, said lock-tongue when guided by said entranceway into said housing, upon pressing said body strip end portions toward one another, having its springy terminal portion bearing upon the bottom of said housing to thereby hold said lock-spur tensionally up-thrust toward the top of said housing with its free end butted against said lock-abutment.

2. A band seal comprising, a body strip having normally separated end portions curved one toward the other, a female locking means at the extremity of one end portion comprising a housing having a laterally flared entranceway at its outer end and a transverse lock abutment inwardly pressed from its top wall intermediate said entranceway and the inner end of said housing, a male locking means at the extremity of the other end portion comprising a lock-tongue having an inwardly inclined springy terminal portion and a lock-spur projecting backwardly and upwardly from said terminal portion, said lock-tongue when guided by said entranceway into said housing, upon pressing said body strip end portions toward one another, having its springy terminal portion bearing upon the bottom of said housing to thereby hold said lock-spur tensionally up-thrust toward the top of said housing with its free end butted against said lock-abutment, and said body strip having means formed in its medial portion to segregate transverse fracture points and operative to exert leverage tending to stretch and break the body strip at said fracture points when the sides of the locked seal band are further pressed toward one another.

3. A band seal comprising, a body strip having normally separated end portions curved one toward the other; a female locking means at the extremity of one end portion comprising a housing formed by an angularly and outwardly bent transverse part of said end portion providing the inner end wall of the housing and a part forwardly extending therefrom to provide the top wall of the housing, side flanges bent downwardly from the side margins of said top wall to provide the side walls of said housing, and bottom flanges inwardly bent from portions of said side flanges to provide the bottom wall portions of the housing, the outer end portion of said housing thus formed being laterally flared to provide an inwardly tapered entranceway leading into the housing interior, a transverse lock abutment inwardly pressed from the housing top wall intermediate said entranceway and the housing inner end wall; and a male locking means at the extremity of the other body strip end portion comprising a lock-tongue having an inwardly inclined springy terminal portion and a lock-spur projecting backwardly and upwardly from said terminal portion, said lock-tongue when guided by said entranceway into said housing, upon pressing said body strip end portions toward one another, having its springy terminal portion bearing upon the housing bottom flanges to thereby hold said lock-spur tensionally up-thrust toward the top wall of said housing with its free end immovably butted against said lock-abutment.

4. A band seal comprising, a body strip having normally separated end portions curved one toward the other; a female locking means at the extremity of one end portion comprising a housing formed by an angularly and outwardly bent transverse part of said end portion providing the inner end wall of the housing and a part forwardly extending therefrom to provide the top wall of the housing, side flanges bent downwardly from the side margins of said top wall to provide the side walls of said housing, and bottom flanges inwardly bent from portions of said side flanges to provide the bottom wall portions of the housing, the outer end portion of said housing thus formed being laterally flared to provide an inwardly tapered entranceway leading into the housing interior, a transverse lock abutment inwardly pressed from the housing top wall intermediate said entranceway and the housing inner end wall; a male locking means at the extremity of the other body strip end portion comprising a lock-tongue having an inwardly inclined springy terminal portion and a lock-spur projecting backwardly and upwardly from said terminal portion, said lock-tongue when guided by said entranceway into said housing, upon pressing said body strip end portions toward one another, having its springy terminal portion bearing upon the housing bottom flanges to thereby hold said lock-spur tensionally up-thrust toward the top wall of said housing with its free end immovably butted against said lock-abutment, and said body strip having means formed in its medial portion to segregate transverse fracture points and operative to exert leverage tending to stretch and break the body strip at said fracture points when the sides of the locked seal band are further pressed toward one another.

5. A band seal comprising; a body strip having normally separated end portions curved one toward the other, a female locking means at the extremity of one end portion, a male locking means at the extremity of the other end portion, said male and female locking means being cooperative to interlock the body strip end portions together when the same are brought together to close the band seal, and said body strip having means formed in its medial portion to segregate transverse fracture points and operative to exert leverage tending to stretch and break the body strip at said fracture points when the sides of the locked seal band are further pressed toward one another.

EMIL DIETZE.